United States Patent [19]

Ohsawa et al.

[11] Patent Number: 5,625,832
[45] Date of Patent: Apr. 29, 1997

[54] DISTRIBUTED PROCESSING CONTROL METHOD AND DISTRIBUTED PROCESSING SYSTEM

[75] Inventors: Gyo Ohsawa; Hideaki Komatsu, both of Yokohama, Japan

[73] Assignee: International Business Machines Corporation, Armonk, N.Y.

[21] Appl. No.: 388,534

[22] Filed: Feb. 14, 1995

[30] Foreign Application Priority Data

Feb. 16, 1994 [JP] Japan .................................. 6-019177

[51] Int. Cl.$^6$ .................................................. G06F 13/00
[52] U.S. Cl. ................... 395/800; 395/200.03; 395/676; 364/230; 364/260; 364/281.3; 364/DIG. 1
[58] Field of Search ......................... 395/200.03, 200.15, 395/840, 841, 851, 853, 650, 700, 800, 375; 364/131–134

[56] References Cited

U.S. PATENT DOCUMENTS

| | | | |
|---|---|---|---|
| 4,633,392 | 12/1986 | Vincent et al. | 395/284 |
| 4,897,777 | 1/1990 | Janke et al. | 364/134 |
| 4,949,254 | 8/1990 | Shorter | 395/700 |
| 5,247,678 | 9/1993 | Littleton | 395/700 |
| 5,438,680 | 8/1995 | Sullivan | 395/650 |
| 5,475,856 | 12/1995 | Kogge | 395/800 |
| 5,517,639 | 5/1996 | Yamaguchi | 395/550 |

*Primary Examiner*—Alpesh M. Shah
*Attorney, Agent, or Firm*—Floyd A. Gonzales

[57] ABSTRACT

A distributed control method and distributed processing system to decrease data communication overhead and to execute a program efficiently. One of processors at which data arrives in a multiprocessing system is selected by a polling process (310 to 312). All data which arrives at the selected processor is received therefrom to fill a control table of sending and receiving data and a control table of calculation sets with marks for indicating the completion of data receipt (314 to 316). Data to be sent is sent so that the control table of sending and receiving data is marked to indicate the completion of data sending (318 to 320). If data has not yet arrived during polling, required data is sent to all processors (322). The execution of actual calculations using array processes is effected by using calculation sets such that the control table of calculation sets is marked indicating the completion of calculation. This is repeated until all calculation sets are received and there are none present indicating that the calculation not been completed thereby indicating that "the execution of calculation is completed" (324 to 328).

14 Claims, 7 Drawing Sheets

DISTRIBUTED PROCESSING CONTROL METHOD AND DISTRIBUTED PROCESSING SYSTEM

BACKGROUND OF THE INVENTION

The present invention relates to a distributed processing control method and a distributed processing system, and, more particularly, to a distributed processing control method and a distributed processing system for effecting the distributed parallel processing of a program such as an application program in a distributed processing system provided with a plurality of processors.

Conventionally, in calculation for the simulation of hydrodynamics or the like by solving a partial differential equation based on a technological calculation or a finite element method or the like, it has been necessary to prepare an extremely large number of arrays. Since, in this case, the amount of calculation is increased, the capacity of memory should be increased and a large memory area prepared in order to hold arrays in memory, and management becomes difficult. For the amount of calculation, a multiprocessor system is used and processing is done in parallel, so that processing speed can be improved and the apparent amount of calculation decreased.

However, even if a multiprocessor system is used and the number of CPUs is increased so that a large memory area is prepared, respective CPUs are connected to a common bus and have access to shared memory, raising the risk of memory contention.

In recent years, the distributed processing system has attracted public attention in which a plurality of CPUs is distributed and provided with local memory in order to effect distributed parallel processing without using shared memory as in the case of the multiprocessor system. This distributed processing system is constituted by connecting a plurality of processors together into a system. Where parallel execution of one application program is effected, the methods below are generally employed.

According to the first method, for parallel execution of an application program, a programmer considers beforehand conditions such as the number or location of processors, the type or amount of data to be allocated to each processor, and the type of calculation executed in each processor, and writes a program based on the considered conditions. The program is then executed so that one application program is executed in parallel on the distributed parallel processing system. In this case, an executable module may be required to be activated on the plurality of processors or data communication between processors may be required at the location of the processor designated by the programmer. Generally, an execution-time library for implementing the activation of this executable module or the communication of required data or the like is previously prepared. The programmer describes a program including a routine to access the execution-time library. Accordingly, the execution sequence of calculation or time of data communication are determined by the programmer.

The second method for parallel execution of an application program is such that the programmer uses a parallel description language for the distributed processing system to describe a program and executes an executable module generated by its language processing system in the distributed processing system. In this case, the programmer generally designates the configuration, e.g., the number of processors, of the distributed processing system for parallel processing of the application program or the distributed arrangement of data or the like upon execution in a static manner (so as to have content which does not change in a time series) or dynamically (so as to have content corresponding to a time series change) in the program. Also, in the second method, the execution-time library for distributed parallel processing is prepared beforehand similarly to the first method. A calling system therefore is often automatically embedded into the executable module by the language processing system. That is, the execution sequence of calculation or the time of data communication is automatically determined by the language processing system.

In addition, a method other than the above described methods is exemplified. This method is such that a program described for a conventional single processor is converted to an executable module for the distributed processing system by directly or indirectly using an automatic parallel conversion program or the like and the obtained executable module is executed. In this case, the programmer may describe the program for the single processor by employing a conventional program language. The programmer must consider the configuration or the like of the distributed processing system upon activation of the automatic parallel conversion program, but need not consider the execution sequence of calculation or the time of data communication or the like.

Since the respective processors of the distributed processing system are not usually connected to shared memory or use a common communication line, there is less restriction on the number of processors connected thereto, but constraint arises about the overhead in communication among the respective processors.

Accordingly, where distributed parallel processing of an application program is done in a distributed processing system provided with a plurality of processors as mentioned above, an important problem arises in that the overhead required for data communication between the respective processors must be reduced. To achieve this purpose, the following methods are mainly used:

The first method is one such that the language processing system or the automatic parallel conversion program or the like analyzes the amount of communication of data, the other party of communication, the time the data is required, or the like, therein, so that it automatically schedules and generates corresponding execution code in the executable module. That is, scheduling is static and calculation and data communication occur at execution in accordance with a previously designated order. When this method is used, processing at execution can be simplified.

As a technique corresponding to such a first method, a program is allocated to processors in accordance with priority in order to effect scheduling relative to a plurality of processors in a parallel computer (see PUPA 5-151180). This technique relates to a scheduling method for a parallel computer provided with a plurality of processors comprising the steps of storing programs executable in each of these processors, providing a plurality of queues having a lock for exclusive processing to prevent programs from being simultaneously allocated to processors, locking those required among the plurality of queues when the program is allocated to a processor, comparing programs with the highest priority among the respective queues, selecting the program with the highest priority among queues, releasing the lock on queues, and allocating the program to the processor.

However, the plurality of queues in this scheduling has no private matrixes corresponding to respective processors and simply gives priority to an executable program by applying a lock thereto if necessary.

Further, the first method of effecting scheduling in a static manner has the following disadvantages: (1) In a case where the configuration of the distributed processing system for executing an executable module is determined at execution, this method cannot handle a case in which the other party for communication or the like can only be determined upon execution. (2) In the distributed processing system, a time lag may arise between sending and receiving sides due to influences such as an error in a communication path or the dispatch of processes in an operating system. When, in the application program, sending and receiving are repeated and scheduling is static, overhead often becomes large.

The second method is such that the language processing system or the automatic parallel conversion program or the like tabulates information, including communication data for the other party in communication, in a table, and scheduling is managed dynamically referencing this table upon execution. This method can handle a case in which information in the table can be only determined upon execution. Since scheduling is dynamic, disadvantages resulting from the first method can be overcome.

In a technique corresponding to the second method, a linkage table in which transmission information is registered is referenced to control communication (see PUPA 1-251266). According to this technique, in a system for communicating a message to a plurality of processors, an identification number indicating the type of message is applied to the message to be communicated. Each processor is provided with a linkage table in which transmission information indicating whether or not the message is sent from each output port for each type of message is registered. Each processor references the corresponding transmission information in the linkage table from the identification number of the received message and controls the message communication based on the content thereof.

However, the table disclosed in this technique is a multiprocessor system which is connected in the form of a mesh, only indicates which direction the path of a message may be directed to, up, down, left, or right, and does not designate any other information.

The second method also has a disadvantage in that execution-time library processing becomes complicated and thus cannot be easily used.

SUMMARY OF THE INVENTION

Given the above, an object of the present invention is to provide a distributed processing control method and a distributed processing system in which overhead required for data communication is decreased and a program can be executed highly efficiently.

Another object of the present invention is to provide a distributed processing system in which a compiler automatically generates object code or the like for optimum communication between processors without a programmer who writes a simulation program or the like intentionally writing a parallel processing instruction.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
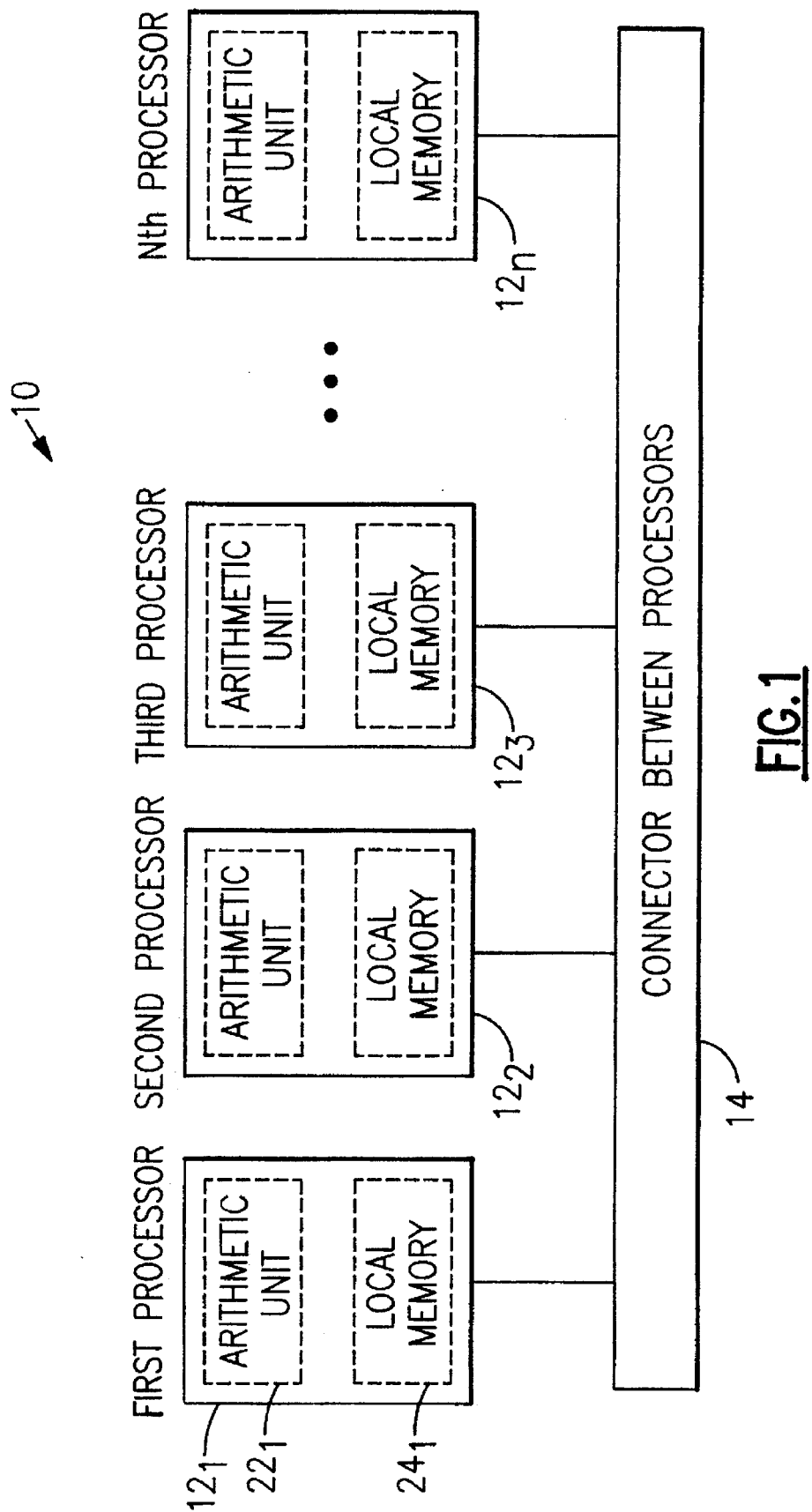
FIG. 1 is a schematic block diagram of a distributed processing system to which the present invention is applicable.

In order to achieve the above mentioned objects, a distributed processing control method of the present invention in a distributed processing system equipped with a plurality of processors, comprises the following steps: (a) designating a group of processors to which a program for distributed parallel processing of calculation is to be loaded, among a plurality of processors, each of which has an ID for identification, and in a predetermined number of processors for which array data is distributed and held, array data belonging to one or a plurality of arrays distributed to and held in the predetermined number of processors included in the plurality of processors; (b) for arrays which are defined or declared in the program, allocating partial arrays, which are to be managed, to each processor included in the group; (c) for calculation using arrays in the program, preparing a table in each processor included in the group, based on partial arrays managed by each processor, a table including a column for listing the IDs of the processors to which information including the array data should be sent from each processor included in the group, and for listing the IDs of processors from which each processor included in the group should receive information, including array data, in order to do the calculation; and (d) executing, in each processor included in the group, calculation using arrays by sending or receiving information between the respective processors included in the group, by referencing to the prepared table.

In the above described table is prepared a column provided with marks to indicate the completion of sending and receiving, and the above method further comprises the following steps of giving marks to a corresponding column of the table in each processor included in the group in response to receiving from or sending to other processors; and a sending or receiving until the table is filled with the marks corresponding to all responses.

The above described step (c) can further include the steps of, for calculation using arrays, sorting array elements held by each processor included in the group from array elements held by other processors; sorting array elements requiring receiving of the array data from array elements requiring no receiving of array data upon calculation in each processor included in the group by using sorting; and calculating a calculation set in which a group of elements of sorted array elements is expressed by an index expression of array elements.

The above described step (c) can further include the steps of: for calculation using arrays, sorting array elements held by each processor included in the group from array elements held by other processors, sorting array elements requiring the receiving of array data from array elements requiring no receiving of array data upon calculation in each processor included in the group by using sorting; further sorting for each processor corresponding to one or a plurality of array elements requiring the receiving of array data upon calculation; and calculating a calculation set in which a group of elements of sorted array elements is expressed by an index expression of the array element.

The above described table comprises a control table of sending/receiving data indicating the correspondence of IDs of other processors to the presence and absence of elements for sending and receiving and control table of the calculation set indicating the correspondence of IDs of other processors requiring the receiving of data on calculation and array elements on calculation.

In the above described step (a), predetermined and specified processors are designated as a group of processors to which a program is to be loaded.

In the above described step (a), predetermined and specified processors designated at the start of program execution are to be designated as a group of processors to which the program is to be loaded.

The table is formed in a module capable of executing the program in each of the processors included in the group.

In order to realize the above-mentioned distributed processing control method, a distributed processing system equipped with a plurality of processors comprises: a designation means for designating a group of processors to which a program for effecting distributed parallel processing of calculation is to be loaded, among the plurality of processors, each of which has an ID for identification and in a predetermined number of processors for which array data is distributed and held, the array data belonging to one or a plurality of arrays dispersed and held in the predetermined number of processors included in the plurality of processors; an allocation means for allocating partial arrays, which are to be managed, to each processor included in the group, for arrays defined or declared in the program; an instruction means for instructing preparation of a table in each processor included in the group, for calculation using arrays in the program, based on partial arrays managed by each processor included in the group, the table including a column for listing IDs of processors to which information including array data should be sent from each processor included in the group and for listing IDs of processors from which each processor included in the group should receive information including array data, in order to effect calculation; and a calculation instruction means for executing, in each processor included in the group, calculation using arrays by sending or receiving information between respective processors included in the group.

In the distributed processing system according to the present invention, the table is provided with a column which is to be filled with marks indicating the completion of sending or receiving information and the system can further comprise a mark-assignment means for giving the mark to the corresponding column of the table in each processor included in the group, in response to the receiving of information from other processors or the sending of information to other processors and a control means for controlling to effect the sending and receiving information until the table is filled with marks in response to all sending and receiving of information.

In the distributed processing system according to the present invention, the instruction means for instructing preparation of a table may include: a first sorting, for calculation using arrays in the program, array elements held by each processor included in the group from array elements held by other processors; a second sorting of array elements requiring the receiving of array data from array elements requiring no receiving of array data, upon calculation in each processor included in the group using said sorting; and a calculation means for calculating a calculation set in which a group of elements of sorted array elements is expressed by an index expression of array elements.

In the distributed processing system of the present invention, the instruction means for instructing preparation of a table can include: a first sorting, for calculation using arrays, array elements held by each processor included in the group from array elements held by other processors; a second sorting of array elements requiring receiving of array data from array elements requiring no receiving of array data upon calculation in each of the processors included in the group using the sorting; a third sorting for each processor corresponding to one or a plurality of array elements requiring the receiving of array data upon calculation and a calculation means for calculating a calculation set in which a group of elements of sorted array elements is expressed by an index expression of array elements.

According to the distributed processing system, the designation means may comprise a reading means for reading a group of predetermined and specified processors designated as the group of processors to which the program is to be loaded.

According to the distributed processing system, the designation means may comprise a reading means for reading a group of predetermined processors which is designated at the start of execution of the program as the group of processors to which the program is to be loaded.

Where calculation or the like are executed by the distributed processing system, data can be sorted as described below depending on which processor data required for calculation belongs to.

All data required for calculation belongs to the processor in which calculation is currently executed.

Part or all of the data required for calculation belongs to an other processor. Therefore, the delivery of data is required before calculation.

The present invention aims at providing a distributed processing control method and a distributed processing system to manage data communication between processors and the execution sequence of calculation in connection therewith dynamically and to effect the execution thereof with high efficiency.

According to the distributed processing control method of the present invention, in a distributed processing system equipped with a plurality of processors, in the step (a) is designated a group of processors to which a program for effecting distributed parallel processing of calculation is to be loaded, among the plurality of processors each of which has an ID for identification and in a predetermined number of processors in which array data is distributed and held, array data belonging to one or a plurality of arrays distributed and held in the predetermined number of processors included in the plurality of processors. In this step (a), predetermined and specified processors are designated as a group of processors to which the program is to be loaded, or predetermined or specified processors designated at the start of program execution are to be designated as a group of processors to which the program is to be loaded. For designating such a group of processors, for example, a method is known for designating them by parameters for compiling or the like or a method is used such that an operator designates them by a command line parameter or the like at the start of program execution. Accordingly, it is preferable to determine a group of processors to which a program is to be loaded in accordance with the execution format of the program.

In the step (b), for arrays which are defined or declared in the program, partial arrays exclusively having a part of the arrays, which are to be managed, are allocated to each processor included in the group. In the next step (c), for calculation using the arrays in the program, a table is prepared in each processor included in the group, based on partial arrays managed by each processor. The table includes a column for listing the IDs of processors to which information including array data should be sent from each processor included in the group, and for listing the IDs of processors from which each processor included in the group should receive information including array data, in order to effect calculation.

Since the sending and receiving of array data or the like is effected between processors, it is desired that, in the table, is prepared a column provided with marks to indicate the completion of sending or receiving of information and the distributed processing control method further includes the following steps of giving marks to corresponding columns of the table in each processor included in the group in response to receiving of information from other processors and sending of information to other processors; and effecting the sending or receiving of information until the table is filled with marks corresponding to all responses.

Since each processor is not usually provided with all array data of arrays used for calculation, the step (c) preferably further includes the steps of: for calculation using arrays, sorting array elements held by each processor included in the group from array elements held by other processors; sorting array elements requiring receiving of array data from array elements requiring no receiving of array data upon calculation in each processor included in the group by using sorting; and calculating a calculation set in which a group of elements of sorted array elements is expressed by an index expression of array elements.

Further, for array elements held by each processor, when calculation is increased, it is difficult to discriminate array elements held by each processor included in the group from array elements held by other processors. Therefore, the step (c) advantageously includes the steps of: for calculation using arrays, sorting array elements held by each processor included in the group from array elements held by other processors; sorting array elements requiring receiving of array data from array elements requiring no receiving of array data upon calculation in each processor included in the group by using sorting; further effecting sorting for each processor corresponding to one or a plurality of array elements requiring receiving of array data upon calculation; and calculating a calculation set in which a group of elements of sorted array elements is expressed by an index expression of the array element.

Furthermore, in the sending or receiving of information, it is troublesome to discriminate a target processor from other processors and to handle data to be sent or received. Therefore, the table preferably comprises a control table of sending and receiving data indicating the correspondence of the IDs of other processors to the presence or absence of elements for the sending or receiving processing to other processors and a control table of the correspondence of the IDs of other processors requiring receiving of data upon calculation to array elements upon calculation.

These tables are preferably formed in the executable module of the program in each processor included in the group.

Accordingly, where sending or receiving of data is effected as mentioned above, information including: when calculation of any data are to be effected, which data is to be required, and from which processor is to be fetched data may be blocked or formed into blocks for each processor included in the group and tabulated. At this time, information indicating whether other processors need data held by processors is tabulated similarly. This operation is executed by the language processing system or the automatic parallel conversion program and information is embedded into the executable module. When information is to be understood only during execution, a corresponding column in the table may be left blank or the like, and may be determined or filled at the time of the start of calculation or at the entry of each routine for the execution of calculation or the like dynamically.

In the next step (d), in each processor included in the group, calculation using arrays are executed by effecting sending or receiving of information between processors included in the group, with reference to the prepared table. For example, upon execution of calculation, the table is referenced and processing as mentioned below will be carried out.

Where required data is sent from other processors for each block of the processor, it is received and a mark indicating completion of the receipt of data is written in the table. At the same time, data held by a private processor and necessary to be sent to the processor which has sent data thereto is searched from the table and the data in question is transmitted to that processor.

The above-mentioned operation is repeated for each block of processors. When all data necessary for executing calculation is received, calculation is executed.

Where required data is not sent to each processor included in the group from any processor, data required by other receiving processors is searched for from the table and data in question is sequentially transmitted to processors included in the group. When all transmission is completed, polling of the above receiving is done again. When required data is sent to each processor included in the group, receiving is done.

When all transmission of data required by other processors is completed and data required by the private processor cannot be received, the private processor is made to wait. At this time, calculation of data all required in the private processor for calculation is executed. Thus, the execution of calculation effected during the wait for data can be duplicated.

The above-mentioned distributed processing control method can be realized by providing a distributed processing system comprising: a designation means for designating a group of processors to which a program for distributed parallel processing of calculation is to be loaded, among the plurality of processors which each have an ID for identification and in a predetermined number of processors of which array data is distributed and held, array data belonging to one or a plurality of arrays distributed and held in the predetermined number of processors included in the plurality of processors; an allocation means for allocating partial arrays, which are to be managed, to each processor included in the group, for arrays which are defined or declared in the program; an instruction means for instructing preparation of a table in each processor included in the group, for calculation using arrays in the program, based on partial arrays managed by each processor included in the group, the table including a column for listing the IDs of processors to which information including array data should be sent from each processor included in the group and for listing the IDs of processors from which each processor included in the group should receive information including array data, in order to effect calculation; and a calculation instruction means for executing, in each processor included in the group, calculation using arrays by effecting sending or receiving of information between processors included in the group.

The instruction means to prepare a table may include: a first sorting means for sorting, for calculation using arrays in the program, array elements held by each processor included in the group from array elements held by other processors; a second sorting means for sorting array elements requiring receiving of array data from array elements requiring no receiving of array data, upon the calculation in each processor included in the group using the sorting processing; and a calculating means for calculating a calculation set in which a group of elements of sorted array elements is expressed by an index expression of array elements.

The instruction means for instructing preparation of a table may include: a first sorting means for sorting, for calculation using arrays, array elements held by each processor included in the group from array elements held by other processors; a second sorting means for sorting array elements requiring receiving of array data from array elements requiring no receiving of array data upon calculation in each processor included in the group using sorting. A third sorting means for effecting sorting for each processor corresponding to one or a plurality of array elements requiring the receiving of array data upon calculation and a calculating means for calculating a calculation set in which a group of elements of sorted array elements is expressed by an index expression of array elements.

The designation means preferably comprise a reading means for reading a group of predetermined and specified processors designated as the group of processors to which the program is to be loaded, or a reading means for reading a group of predetermined processors which is designated at the start of program execution as the group of processors to which the program is to be loaded.

According to the present invention, upon the execution of calculation, data communication required between processors can be controlled dynamically and data communication overhead can be decreased. When all data necessary for calculation is received, the execution of calculation can be sequentially started in each processor included in the group. Further, information concerning data communication or the like can be controlled dynamically upon the execution of calculation. Therefore, such information determined only at execution of calculation can be met.

Now, an embodiment of the present invention will be described below. In this embodiment, the present invention is applied to a distributed processing system in which a plurality of processors, each having local memory, is interconnected. The distributed processing system according to the present invention is applicable not to a single multiprocessor system of a shared memory type, but to a distributed processing system in which a plurality of multiprocessors is interconnected.

In this embodiment, FORTRAN was employed as the programming language in order to effect execution of processors. Particularly, FORTRAN 90was used as an example. The detailed specification of FORTRAN 90 itself are disclosed in the "FORTRAN 90 HANDBOOK Complete ANSI/ISO Reference," Jeanne C. Adams et al., McGraw Hill Inc., for example.

As shown in FIG. 1, the distributed processing system 10 of the present embodiment comprises a plurality of processors $12_1$ to $12_n$ (n is a natural number), and a connector 14 between processors connected to these processors $12_1$ to $12_n$ to send or receive data therebetween. Each processors $12_p$ (p: $1 \leq p \leq n$) includes an arithmetic unit $22_p$ and local memory $24_p$. Local memory $24_p$ may include a disk device such as a hard disk or the like.

Since the respective configurations of the plurality of processors $12_1$ to $12_n$ are the same, the configuration of the processor $12_1$ will be described below as an example, and the explanation of other processors will be omitted.

Figure 2:
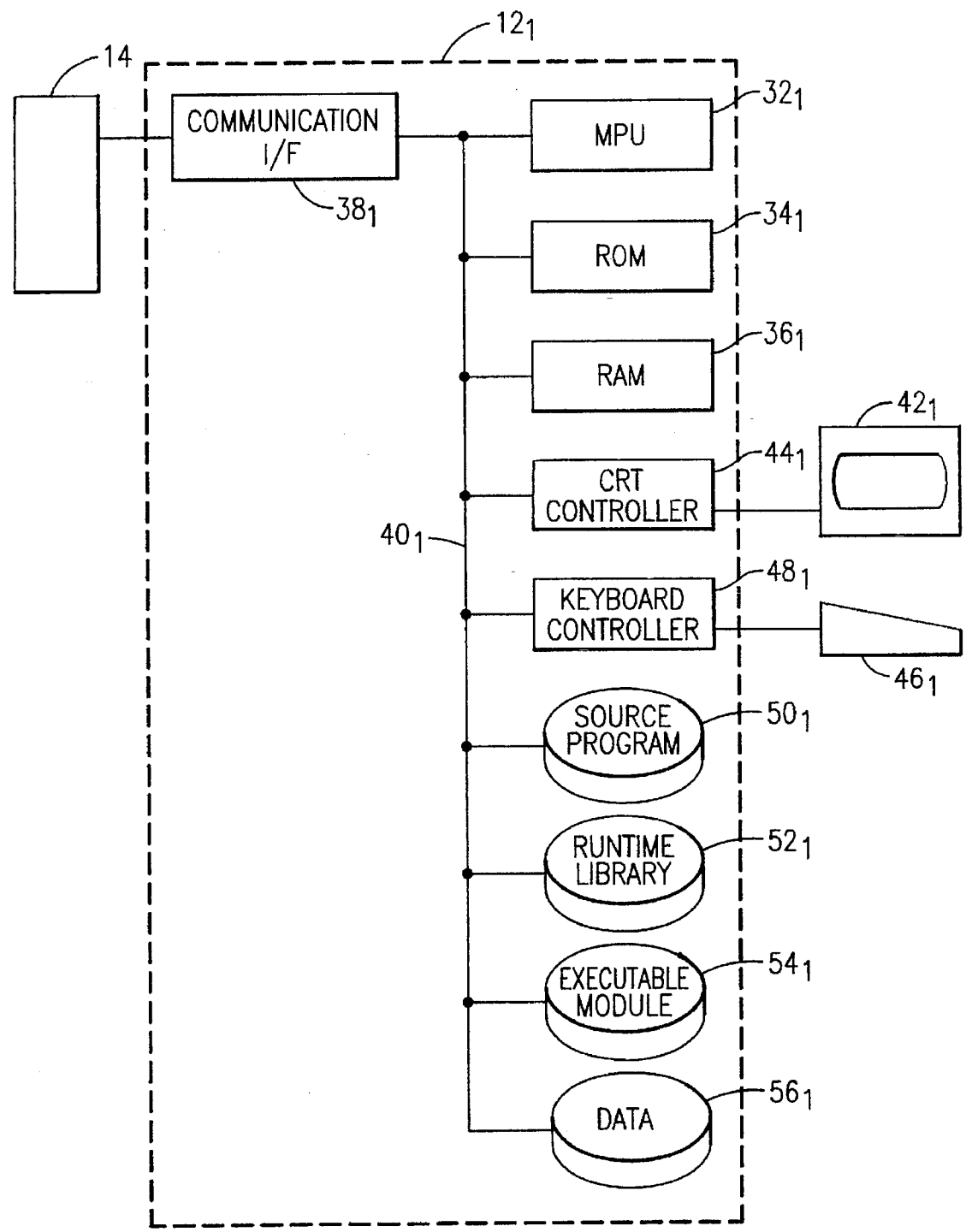
FIG. 2 is a schematic block diagram of each processor included in the distributed processing system of an embodiment of the present invention.

As shown in FIG. 2, the processor $12_1$ includes a microprocessor unit MPU $32_1$, a read only memory ROM $34_1$, and a random access memory RAM $36_1$ making up an arithmetic unit, which are connected to a bus $40_1$ to send or receive commands or data therebetween. The MPU $32_1$ is connected to the connector 14 between processors through a communication interface $38_1$. The bus $40_1$ is connected to a CRT $42_1$ through a CRT controller $44_1$ and connected to a keyboard $46_1$ through a keyboard driver $48_1$. The CRT $42_1$, the CRT controller $44_1$, the keyboard $46_1$ and the keyboard driver $48_1$ are designed to be used for displaying the command input of an operator (referred to as a programmer, hereinafter) or the result of calculation. They are not necessary in the case in which only calculation is executed in the processor $12_1$.

The processor $12_1$ includes a local memory having a source program storage device $50_1$ for storing a source program, an execution-time library storage device $52_1$ for storing an execution-time library module, an executable module storage drive $54_1$ for storing an executable module and a data storage drive $56_1$ for storing data used for calculation. The source program, the execution-time library module, the executable module, or data may be stored in a storage device (for example, a hard disk) with an independent configuration without using these storage devices. In addition, the source program, the execution-time library module, and the executable module may be input thereto through communication from other processors.

In the present embodiment, for data used for calculation, data (referred to as array data, hereinafter) corresponding to array elements (index expression) of arrays with predetermined dimensions is assumed. For example, as seen from FIG. 3, when an array a is declared as an array a(100, 100), this means that array data is vertically and horizontally assigned two-dimensionally from array data corresponding to the assignment of an array element a(1, 1) to array data corresponding to the assignment of an array element (100, 100).

In the distributed processing system 10 of this embodiment of the present invention, such array data is distributed and held in each data storage device $56_p$ of a processor $12_p$. For effecting calculation, each processor selects only arrays within a range held by a private processor among arrays and executes calculation. That is, in the present embodiment, it is assumed that a plurality of array data belonging to arrays declared by the programmer is distributed and held in the plurality of processors and that for execution of calculation using arrays, each processor selects only array elements held by a private processor among arrays, in order to effect calculation.

In the explanation as mentioned below, it is assumed that the distributed processing system 10 comprises four processors, including the first processor $12_1$ to the fourth processor $12_4$, which are connected to the connector 14 between processors. However, it can be seen that the number of processors included in the distributed processing system 10 to which the present invention is applicable is not limited to four.

Figure 3:
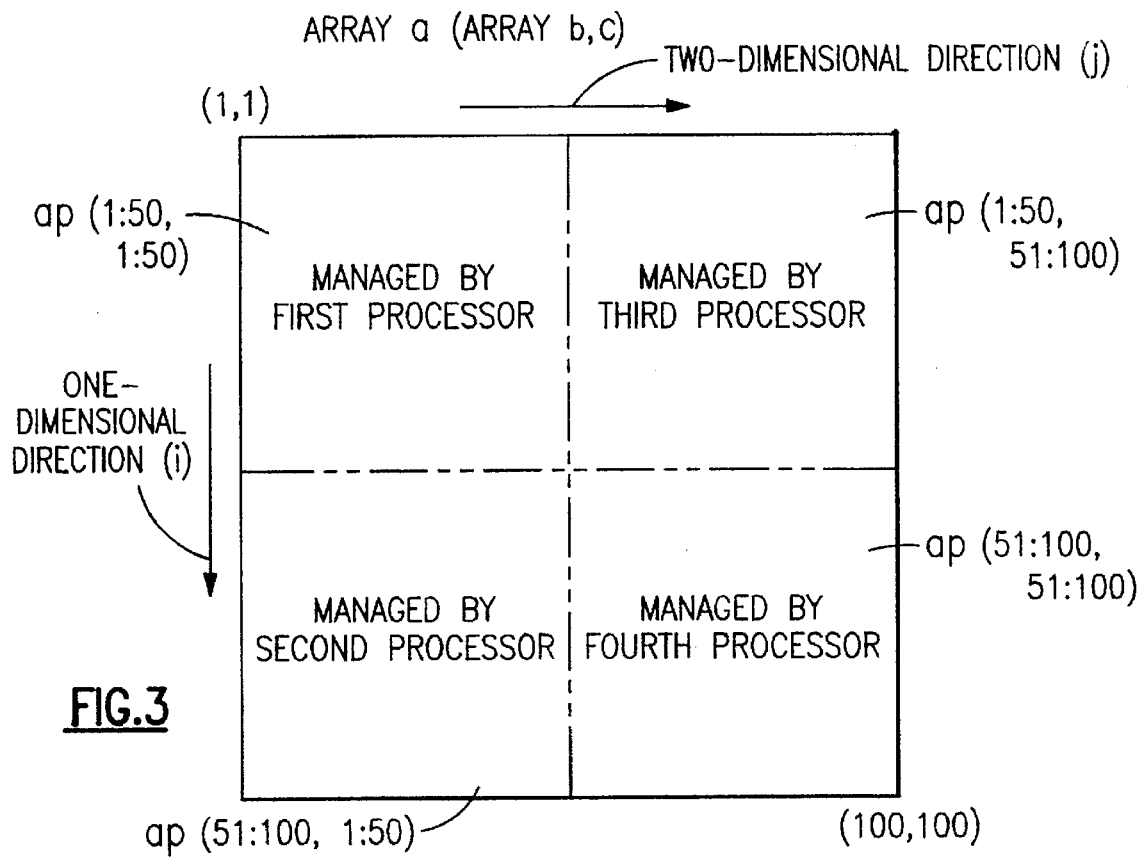
FIG. 3 is an image view for explaining a state in which array data is distributed and held in a plurality of processors, for arrays used in the present embodiment.

In an example shown in FIG. 3, array data held by each processor $12_p$, in the case of the first processor $12_1$, ranges from array data corresponding to the assignment of an array element a(1, 1) to array data corresponding to the assignment of an array element a(50, 50). Arrays corresponding to partial assignment ranging from the assignment of the array element a(1, 1) to the assignment of the array element a(50, 50) of the array are expressed by partial arrays ap(1:50, 1:50), hereafter.

The second processor $12_2$ holds a range from array data corresponding to the assignment of an array element a(51, 1) to array data corresponding to the assignment of an array element a(100, 50). Accordingly, the second processor $12_2$ holds array data corresponding to partial arrays ap(51:100, 1:50) in the array a. The third processor $12_3$ holds array data corresponding to the assignment of an array element a(1, 51) to array data corresponding to the assignment of an array element a(50, 100). Accordingly, the third processor $12_3$ holds array data corresponding to partial arrays ap(1:50, 51:100) in the array a. The fourth processor $12_4$ holds array data corresponding to the assignment of an array element a(51, 51) to array data corresponding to the assignment of an array element a(100, 100). Accordingly, the fourth processor $12_4$ holds array data corresponding to partial arrays ap(51:100, 51:100) in the array a.

Array data belonging to an array b (not shown) declared as an array b(100, 100) is also dispersed and held in processors including the first processor $12_1$ to the fourth processor $12_4$ as in the case of the array a. Further, array data belonging to an array c (not shown) declared as an array c(100, 100) is also dispersed and held in processors, as in the case of the array a. As can be seen from the above description, array data belonging to arrays a, b and c is divided and held in each processor in accordance with a cross-cut equational division method, as shown in FIG. 3. It is to be noted that this division method is not limited to the cross-cut equational division method. For example, a stripe division method or the like may be used in which array data is simply divided vertically (one-dimensionally in FIG. 3) and horizontally (two-dimensionally in FIG. 3). A nonequational division method may be adopted without restricting directions or regions. However, this method is not preferable because the execution thereof is complicated. With the difficulty at execution considered, partial arrays obtained in accordance with the division method as mentioned above, which substantially coincide with a group of ranges of array data, are more preferable.

Figure 4:
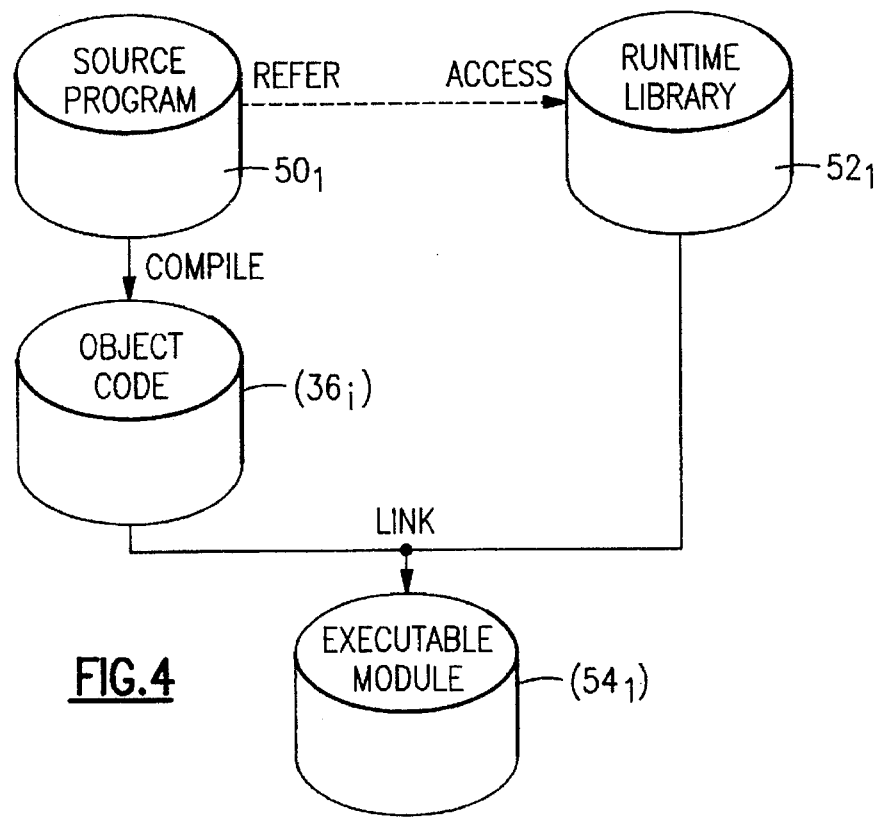
FIG. 4 is an explanatory view for explaining processes to obtain an executable module in the present embodiment.

Now, an operation of the present embodiment of the distributed processing system will be described below. Firstly, with reference to FIG. 4, a process for obtaining an executable module by employing the first processor $12_1$ as an execution processor will be briefly described. As instructed by the programmer, the source program stored in the source program storage device $50_1$ is sequentially scanned and compiled with reference to the execution-time library storage device $52_1$. Thus, object code relative to the source program is obtained and linked to object code of the execution-time library to obtain the executable module. This executable module is stored in the executable module storage device $54_1$. Object code for the source program may be stored in RAM or in a storage device (not shown).

In the present embodiment, examples applied to iteration (referred to as loop processing, hereinafter) of arrays, such as the DO or WHILE statement, included in the above-mentioned source program, object code, and executable module. Therefore, as described before, a case is assumed in which array data belonging to arrays declared by the programmer is distributed and held in the plurality of processors and that, for executing calculation using arrays, each processor selects only part among arrays held by a private processor in order to effect calculation.

As will be explained in the following, calculation corresponding to the source program including loop processing described in (Program example 1) shown below is executed in the distributed processing system 10 comprising the four processors. As illustrated in FIG. 3, it is assumed that array data belonging to arrays a, b, and c declared by the programmer is distributed and held in the four processors.

(Program example 1)
real a(100, 100), b(100,100), c(100,100)
..............
do i = 2,99
  do j = 2,99
    a(i,j) = b(i+1, j+1) – c(i–1, j+1)
  end do
end do
..............

As understood from this Program example 1, the first processor $12_1$ executes calculation and substitution of the result for the array element a(50, 50). Calculation and substitution of the result for the array element a(51, 51) are executed by the fourth processor $12_4$. In calculation of the array element a(50, 50) by the program 1, values of the array element b(51, 51) and array element c(49, 51) are necessary. Since they are held by the fourth processor $12_4$ and the third processor $12_3$, data communication is required before calculation.

Therefore, as described later in detail, a control table for sending and receiving data and a control table for a calculation set are prepared in each processor. The control table for sending and receiving data indicates whether communication with other processors is required for calculation. Control table of a calculation set indicates the relationship between partial arrays required to be received before execution of calculation in a private processor upon execution of calculation in each processor and each processor included in the group of processors to which a program for effecting distributed parallel processing of calculation is to be loaded. In the following explanation, partial arrays to be sorted as shown below upon the execution of calculation is called a calculation set. For example, for the first processor $12_1$ tables shown in Table 1 and Table 2 are prepared.

TABLE 1

Control table for the first processor $12_1$ for sending and receiving data for each other processor

| | Partial arrays bp | | Partial arrays cp | | Completion Mark | |
|---|---|---|---|---|---|---|
| Processor | Receiving element | Sending element | Receiving element | Sending element | Receiving | Sending |
| 2 | (51:51, 3:50) | No | No | (50:50, 3:50) | 1/0 | 1/0 |
| 3 | (3:50, 51:51) | No | (1:49, 51:51) | No | 1/0 | 1/0 |
| 4 | (51:51, 51:51) | No | No | No | 1/0 | 0 |

TABLE 2

Control table for calculation set of an array a in the first processor $12_1$

| Calculation set of array a | Number of processors requiring receiving operation | Mark indicating the completion of receiving |
|---|---|---|
| (2:49, 2:49) | No | 1/0 |
| (50:50, 2:49) | 2 | 1/0 |
| (2:49, 50:50) | 3 | 1/0 |
| (50:50, 50:50) | 3, 4 | 1/0 |

According to the Table 1, the first processor $12_1$ needs to receive, for example, partial arrays bp(51:51, 3:50) from the second processor $12_2$ and to send partial arrays cp(50:50, 3:50). According to the Table 2, in order to effect calculation of the array data corresponding to an array element a(50, 50), data needs to be received from the third processor $12_3$ and the fourth processor $12_4$.

In Table 1, columns are included in which marks representing the completion of sending and receiving (represented, for example, by a flag of one bit of "1" when completed, or a flag of one bit of "0" if not completed), are given, based on the entries of receiving elements from other processors and of transmitting elements to other processors. In Table 2, columns are included in which completion marks representing the completion of receiving (represented, for example, by a flag of one bit of "1" when completed, or a flag of one bit of "0" if not completed) are given, based on the entry of the calculation set.

The preparation of Tables 1 and 2 varies with the number of processors in the distributed processing system or the environment of each processor. Therefore, it can be seen that the present invention does not restrict the time for preparing tables. Tables may be prepared by automatically considering the environment of the distributed processing system, for example, when forming object code by a compiler or linking object code. Tables may be prepared by considering option parameters in which the number of processors to be used or the like is designated.

Specifically, "the execution of calculation" in this embodiment implies the execution of an instruction string equivalent to part of blocks of the source program, and does not imply the execution of all of the program. Therefore, all information is not necessarily obtained upon compiling or linking.

Consequently, in the case where required information is not obtained, information is taken dynamically upon execution of the calculation so that a process is continued. It should be noted that the compiler may automatically search an environment or the number of processors for the required information or the required information may be designated based on option parameters. In this case, the compiler can form all tables statically so that calculation overhead calculation can be reduced, as compared to a case in which tables are formed dynamically upon the execution thereof. However, when it is desired to change the number of processors to be used, recompilation is required, which is disadvantageous in view of flexibility.

Therefore, tables of information necessary for "the execution of calculation" may be prepared by the compiler statically, or missing information may be supplemented by the library or the like dynamically upon the execution of calculation. That is, tables may be prepared statically at compilation or dynamically at program execution.

When tables are prepared statically at compilation of the former, for example, when compilation is effected with parameters for designating that the number of processors used for program execution is four, in the case of the array of 100×100, as described above, quarter-division (see FIG. 3) of this array can be performed upon compilation and this array can be embedded in an executable module in which Tables 1 and 2 are formed statically at compilation. From the viewpoint of program execution efficiency, the former is preferable because tables need not be prepared at program execution.

Tables are prepared dynamically at program execution of the program, as the latter, which implies that the number of processors for effecting distributed parallel processing is given as a command line parameter, when the program is executed. In this case, the executable module is loaded in each processor and then it prepares tables dynamically by allocating main storage device memory to each processor in accordance with parameters for designating the number of processors.

Next, the distributed processing system 10 flow according to the present invention will be described. It can be seen that, in the present invention, there is no particular limitation concerning the loading of a program as to distribute and load the executable module in a plurality of processors upon the program loading. Generally, the number of the processors to be used or the like may be designated in the distributed processing system by any means upon execution of the executable module. Based on this designation, an operator may initially start an executable module in one processor and sequentially start the same executable modules in other processors by using an environment initialization routine for execution or the like therefrom. Now, it is assumed that designation upon execution of the executable module is effected by the operator in the present embodiment and an explanation therefor will be given below with reference to the flowchart shown in FIG. 5.

Figure 5:
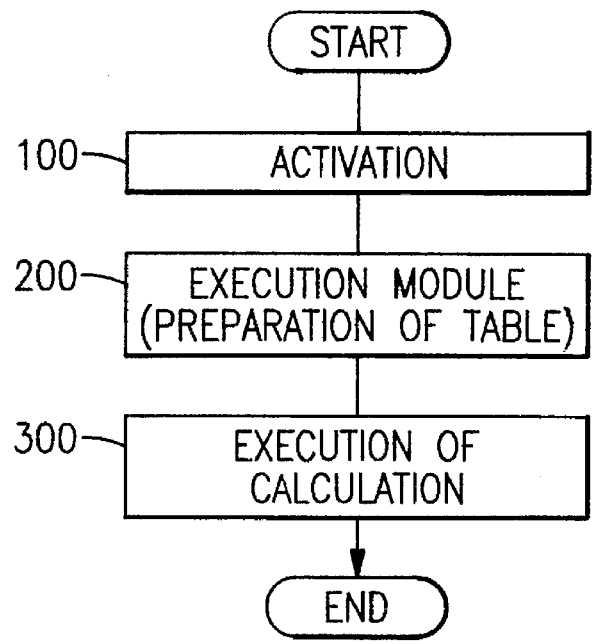
FIG. 5 is a flowchart showing the distributed processing system flow in the present embodiment.

At step 100 in FIG. 5, the executable module is started in each of the processor based on the instruction of the operator or the like. At step 200, the control table of sending and receiving data and the control table of calculation sets (Tables 1 and 2) corresponding to the executable module are prepared, and calculation is executed with reference to the prepared tables.

Figure 6:
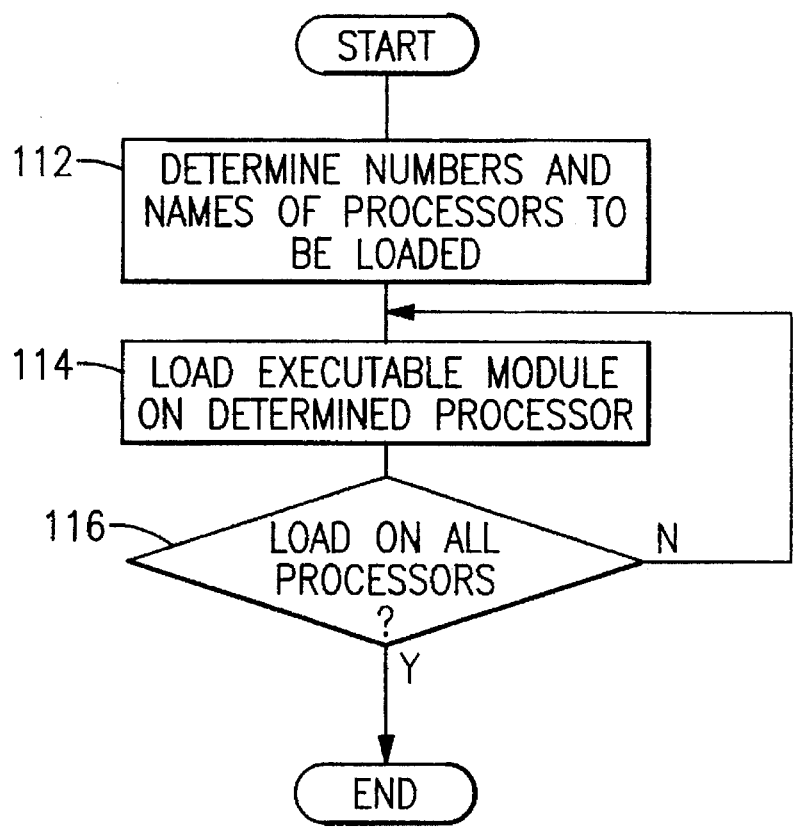
FIG. 6 is a flowchart showing the flow of the start of the executable module in the distributed processing system of the present embodiment.

The start of step 100 will be described in detail referring to the flowchart shown in FIG. 6. At step 112 in FIG. 6, the number or names of processors used to which the executable module is to be loaded are determined. That is, since the operator designates the number or names of processors to be used by some means, they are determined upon execution of calculation in the executable module. In some distributed processing systems, processing when the operator omits the designation of the number or names of processors (for example, when using a total processor) can be preset as a default.

At step 114, the executable module is loaded in the determined processor. In other words, one processor is selected and the executable module is started thereon. In this case, when the executable module exists in a disk device which has been already connected to the processor in question, an instruction for loading may be simply sent to the disk device. Otherwise, it is necessary to send the executable module to that processor. This is repeated until executed on all processors (step 116).

Figure 7:
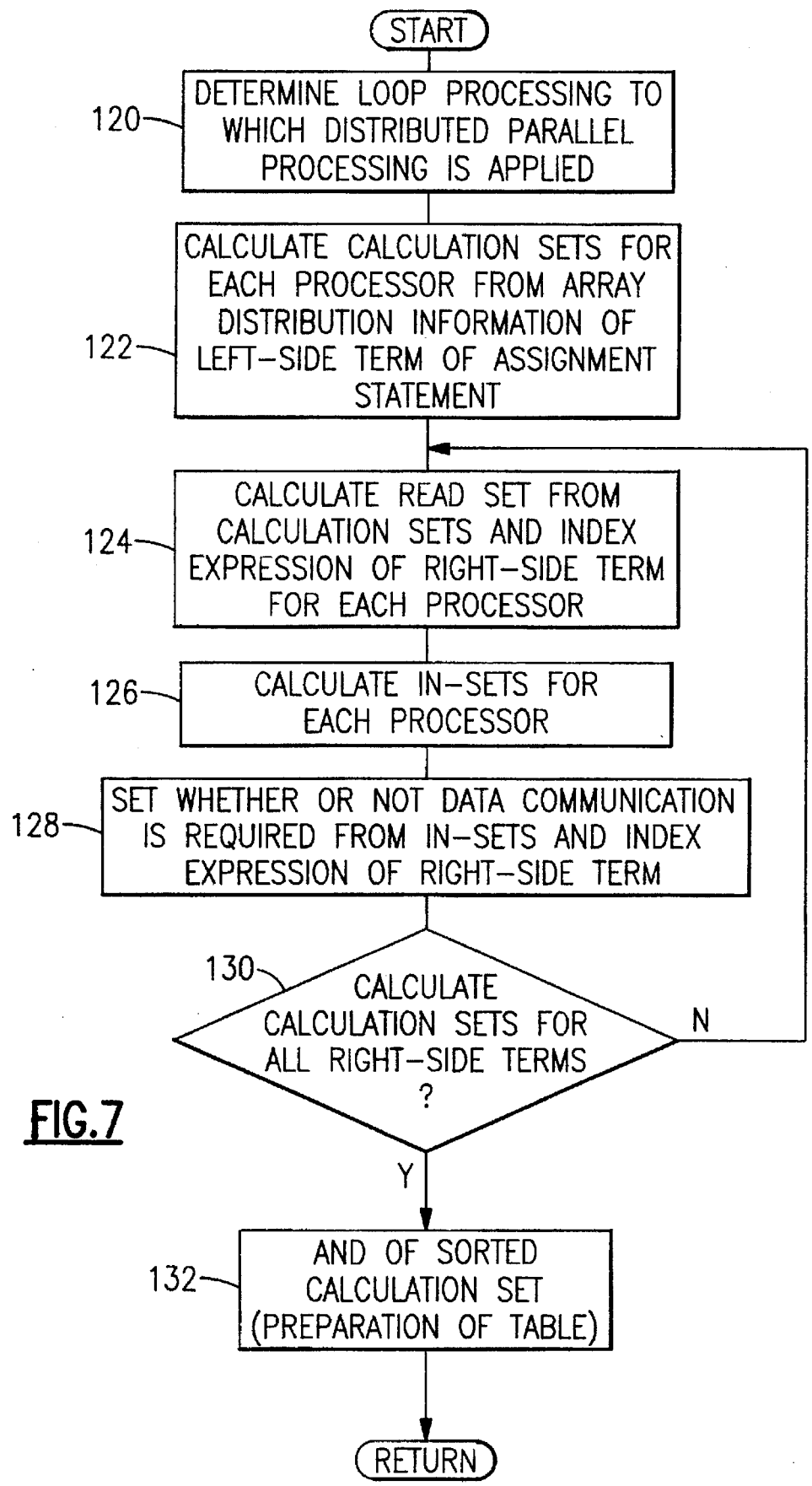
FIG. 7 is a flowchart showing the flow of the generation of a control table of sending and receiving data and a control table of calculation sets in the present embodiment.

Then, preparation of the control table of sending and receiving data and the control table of calculation sets included in step 200 shown in FIG. 5 will be described in detail with reference to the flowchart of FIG. 7. As mentioned before, for the formation of tables, the compiler cannot always determine all items in the table statically. Therefore, in this embodiment, an explanation will be given of the processes that the compiler uses to analyze the source code and form tables in the executable module, assuming a case in which the number of processors or how arrays which are declared in source code are distributed to on a plurality of processors is previously understood and the compiler executes these processes statically. In dynamic processes in which the compiler cannot execute processes statically, the same processes as those shown in the flowchart in FIG. 7 may be executed in the library upon execution of the executable module so that tables are completed.

At step 120, a do loop (loop processing) for the distributed parallel processing of calculation is determined. The do loop includes calculation using arrays in the loop as in Program example 1. Distributed parallel processing of calculation is effected on the do loop in which array data belonging to arrays is dispersed to a plurality of processors and calculation as described above is executed on each processor.

At step 122, a calculation set is formed for each processor based on array distribution information obtained from the subject term of an assignment statement (equivalent to a(i, j)=b(i+1, j+1)−c(i−1, j+1) in Program example 1, referred to as the assignment statement S, hereinafter) which corresponds to an operation expression in loop processing. That is, where distribution of the assignment statement for calculation using arrays is effected, each processor executes calculation for the assignment to array elements within the range distributed and held by the private processor in the array of the left-side term.

For example, in Program example 1, since the first processor $12_1$ holds the respective array data of partial arrays ap(1:50, 1:50) of the array a, for partial arrays ap(2:50, 2:50) as the calculation set of the processor, calculation of the right side of the assignment statement S, and the result is assigned to the left side. With other processors, calculation for the calculation set is similarly executed.

At step 124, a lead set for right-side terms is obtained for each processor based on the calculation set and index expressions of right-side terms of the assignment statement S for each processor. This index expression is (i+1,j+1) for the array b and (i−1, j+1) for the array c. In this way, since the right side of the assignment statement is generally composed of a plurality of terms, this processing is effected for each term. When each term is constituted of array elements using the index expression, the partial arrays needed in the array of the term are determined as a lead set, based on the calculation set to be managed for each processor. This "lead set" represents a set of arrays necessary for calculation using arrays (generally, on the right side of the arrays).

In this case, for (i+1, j+1) of the first term on the right side, calculation using arrays executed on the first processor $12_1$ will be described. The index expression of this term is (i+1, j+1) and the calculation set is (2:50, 2:50). Therefore, partial arrays bp(3:51, 3:51) are required upon execution of calculation. Accordingly, the lead set for the right-side term for the first processor 121 is (3:51, 3:51). Similar processes are repeated for all right-side terms so that lead sets are obtained for each processor.

In step 126, based on lead sets for each processor and array distribution information on right-side terms, an in-set (for arrays in right-side terms, information indicating that array elements necessary for effecting calculation in each processor are sorted into those held by a private processor and those held by other processors) is obtained. That is, array elements requiring no communication between processors since the private processor holds the lead set for each term on the right side are sorted and separated from those requiring communication therebetween since other processors hold lead sets. In this case, based on the lead set of the array b in the first term on the right side in the case of the first processor $12_1$, and array dispersion information, array elements are divided into four of (3:50, 3:50), (51:51, 3:50), (3:50, 51:51), and (51:51, 51:51). Therefore, information on the array b in Table 1 can be formed (for the array c of the second term on the right side, information of Table 1 can be formed in accordance with similar processes).

At step 128, based on the in-set and index expressions of right-side terms, calculation sets of array elements already sorted in which array elements requiring updating of data are sorted and separated from those requiring no updating of data are calculated. That is, since information concerning data communication of right-side terms can be understood from the in-set, then the calculation set of the left-side term is sorted to one requiring data communication between processors from one requiring no data communication between processors. In this case, since the index expression of the array b which is the first term of the right side for the first processor $12_1$ is (i+1, j+1), calculation sets of sorted array elements thus obtained are (2:49, 2:49), (50:50, 2:49), (2:49, 50:50), and (50: 50, 50:50) in view of the index expression of the left-side term (i, j).

The execution of processes as mentioned above is repeated until calculation sets of sorted array elements are obtained relative to all right-side terms (step 130). Then, all calculation sets of the sorted array elements are ANDed and, for those having a solution not blank information for the respective related terms is collected and tabulated. Namely, as a result of the above described processes, all calculation sets of sorted array elements are obtained for each of the right-side terms. Therefore, in order to execute the calculation for each calculation set from the combination thereof, corresponding information for processors requiring the receiving of data is collected to prepare a table.

In this case, the first processor $12_1$ will be explained as an example. Calculation sets of sorted array elements for the first term b(i+1, j+1) of the right side are represented by (2:49, 2:49), (50:50, 2:49), (2:49, 50:50), (50:50, 50:50). For the second term c (i−1, j+1) of the right side, the calculation sets are represented by (2:50, 2:49), (2:50, 50:50). Therefore, each of the four calculation sets is ANDed for the first term and the two calculation sets for the second term. For example, in the case of the fourth calculation set (50:50, 50:50) for the first term and the second calculation set (2:50, 50:50) for the second term, the AND thereof is represented by (50:50, 50:50). This calculation set (50:50, 50:50) indicates, for the execution calculation, that receiving for the fourth calculation set for the first term of the right side (receiving of partial arrays bp(51:51, 51:51) from the fourth processor $12_4$) and receiving for the second calculation set of the second term (receiving of partial arrays c(1:49, 51:51) from the third processor $12_3$) are both required. These processes are executed so that the control table of calculation sets illustrated in Table 2 can be prepared.

Then, in this embodiment, the execution-time library, which is a string of execution instructions composed of machine language equivalent to a program shown by (Program example 2) is generated in the executable module as the executable module corresponding to the above-mentioned (Program example 1). The execution-time library including data_send_receive, get_iteration_set as shown below is generated in the executable module. This means that when the compiler detects an iteration loop such as do or while in source code, a code corresponding to these instructions is automatically inserted. Basically, it means that, when calculation is executed on a plurality of array elements of the same array by employing the iteration do loop, code is inserted. Precisely speaking, no execution-time library is formed in the executable module, but an instruction for calling the execution-time library is generated in the executable module.

The instruction call data_send_receive of this (Program example 2) corresponds to data sending or receiving in accordance with the execution-time library data_send_receive. An instruction call get_iteration_set (2, start, end) corresponds to a repeat argument setting process by the execution-time library get_iteration_set (2, start, end).

```
(Program example 2)
While (having calculation sets of the array a)
    call data_send_receive
    call get_iteration_set(2, start, end)
    do i = start(1), end(1)
        do j = start(2), end(2)
            a(i, j) = b(i+1, j+1) − c(i−1, j+1)
        end do
    end do
end while
    .............
```

The number of arguments in the above described execution—time library get_iteration_set() differ with the depth of the loop. Therefore, a plurality of execution—time libraries get_iteration_set() having various numbers of arguments may be prepared but the program becomes complicated and is not realized. Accordingly, in the above described (Program example 2), a buffer required for return values is prepared in memory such as a stack and the value indicating the depth of the loop and the address of the buffer are sent as arguments. That is, in the case of the above described program, two sets of start, end arguments are set.

Thus, (Program example 2) is equivalent to (Program example 3) described below.

```
(Program example 3)
While (having the calculation set of the array a)
    call data_send_receive
    call get_iteration_set(i_start, i_end, j_start,
j_end)
    do i = i_start, i_end
        do j = j_start, j_end
            a(i, j) = b(i+1, j+1) − c(i−1, j+1)
        end do
    end do
end while
    .............
```

The calculation at step 300 shown in FIG. 5 will be described in detail using Program example 2.

In the above described Program example 2, the execution-time library data_send_receive is called, marks indicating the completion of data sending or receiving are given in the control table of sending and receiving data and the control table of calculation sets. That is, referring to the control table of sending and receiving data (Table 1), whether or not array elements to be received for each processor or each array arrive by polling (a process for regularly deciding receiving status) is recognized. When they arrive, data corresponding thereto is received and a mark is given to the sending or receiving control data for indicating the completion of data receiving. As a result of this receipt, when all data is received from the processors in question, marks representing the receipt of data are given to the control table of calculation sets (Table 2). Where data to be transmitted from the private processor to the processor which sends the data exists, when data is received, that data is in turn sent to that processor to fill the control table of sending and receiving data with a mark indicating the completion of the data sending. Where data to be received from other processors does not exist in polling, data to be sent from the private processor is sequentially sent while referring to the control table of sending and receiving data to fill the control table of sending and receiving data with marks indicating the completion of data sending.

Then, the execution—time library get_iteration_set is called, so that loop control variable setting processes are executed. That is, referring to the control table of calculation sets, for one of the calculation sets of the array a in which calculation has not been executed, the calculation set of the array a in which the receipt of all data is completed is searched for and the value thereof is set to a loop control variable. For example, as seen in the second line of Table 2, when data is received from the second processor $12_2$ and calculation for the array (50:50, 2:49) is executed, 50, 50 are set for indexes start, end to i, and 2, 49 are set for indexes start, end to j and that calculation set is marked to indicate the completion of calculation. If the calculation set has not yet been detected, then a calculation set requiring no receiving is searched for, its value is set for a loop control variable. For example, the calculation set shown in the first line of Table 2 corresponds thereto, if calculation thereof has not been yet executed, then 2, 49 are set for indexes start, end to i and 2, 49 are set for indexes start, end to j) and that calculation set is marked to indicate the completion of calculation. Where calculation of any calculation set cannot be executed because of waiting for data or the like, the above execution-time library data_send_receive is rerun.

Based on the respective indexes start, end set described above, the calculation for partial arrays held by the private processor is executed.

In this way, with reference to the control table of sending and receiving data (Table 1) and the control table of calculation sets (Table 2), while some calculation sets of arrays remain to be executed by the private processor whose calculation are not completed, the above operations are repeatedly executed.

Figure 8:
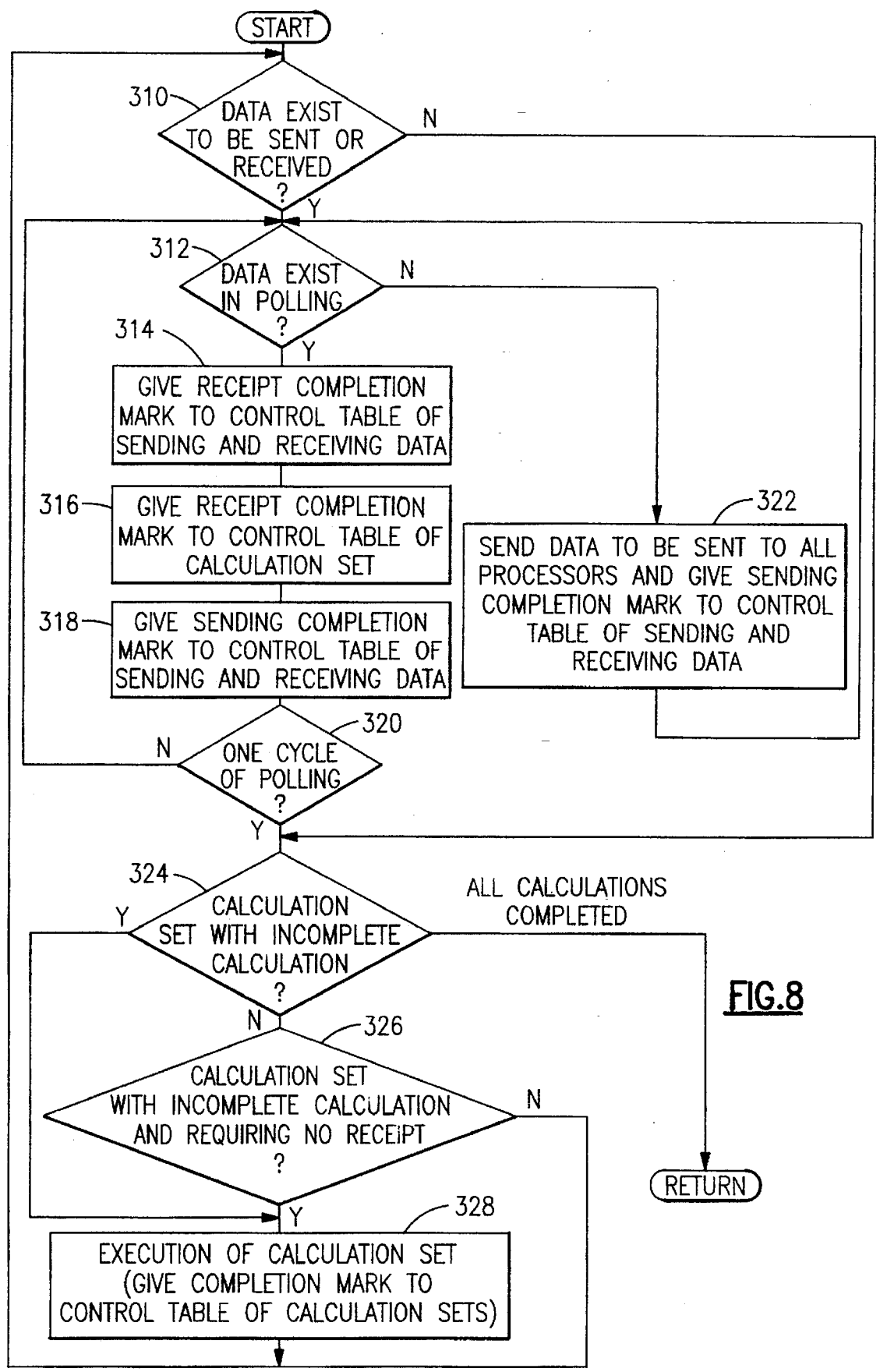
FIG. 8 is a flowchart showing the calculation flow with reference to the control table of sending and receiving data and the control table of calculation sets.

While the control table (Table 1) of sending and receiving data and the control table (Table 2) of calculation sets are referred to, processes to be executed by processors will be further described with reference to a flowchart shown in FIG. 8. At step 310 in FIG. 8, it is determined whether or not data to be sent or received exists. In this case, while data not yet sent or received exists in the control table of sending and receiving data, the execution-time library data_send_receive () is executed. At the next step, 312, one processor at which data arrives is selected in polling. That is, for processors which are not marked to indicate the completion of data receiving, polling is sequentially executed thereon, and one processor at which data arrives is selected. If a processor is not present, processing goes to step 322.

When one processor is selected, all data is received from that processor at step 314 to fill the control table of receiving and sending data with a mark to indicate the completion of data receiving. Namely, all data arriving at the selected processor is received therefrom. Upon sending of data, when a plurality of data to be sent to a sending destination exist, each processor sends all data together thereto. Accordingly, all data to be received from the processor can be received in one receiving operation. Then, a mark indicating the completion of the data receiving is given to the control table of sending and receiving data.

At the next step, 316, a mark indicating data receiving from the processor in question is given to the control table of calculation sets. At the next step, 318, the control table of sending and receiving data is referred to and, if data to be sent to the processor in question exists, then that data is sent thereto and the control table of sending and receiving data is filled with marks to indicate the completion of data sending. That is, when, after data is received from the processor, data to be sent to that processor remains, the remaining data is sent thereto and the control table of sending and receiving data is filled with marks to indicate the completion of data sending. Then, at the next step, 320, for processors from which data is not received, whether or not one-cycle polling is executed is determined and, when a processor at which data arrives can be selected, the process returns to step 312 in order to check data arrival from other processors.

When a response is negative at step 312, all data to be sent is sequentially sent to all processors at step 322 to fill the control table of sending and receiving data with marks to indicate the completion of the data sending. In this step, since data does not arrive from any processor in polling, receiving cannot be executed at that time. Therefore, this step is executed to sequentially send data required for all processors and filling the control table of sending and receiving data with marks to indicate the completion of data sending. Subsequent to step 322, the process continues polling again.

At the next step, 324, it is determined whether or not some calculation sets exist which have been already received and calculation of which has not been yet completed, or whether or not all have been executed. When at least one exists, one calculation set received and calculation of which has not been executed is selected, and processing goes to step 328. At this time, a calculation set for which calculation can be done is selected.

However, when "no" is determined at step 324, no calculation set can be selected at that time because calculation sets for which calculation has not yet been executed exist but data thereof is not received. Therefore, processing goes to step 328. When it is determined that "calculation has all been executed," processing ends because the execution of all calculation sets is completed.

At step 326, it is determined whether or not there exist calculation sets which require no data receiving and for which calculation has not yet been completed. If they exist, then, one calculation set which requires no data receiving and for which calculation has not yet been completed is selected and processing goes to step 328. At this time, if the calculation set cannot be selected because data is not received, a calculation set which requires no data receiving is selected. If not, when calculation sets which require no data receiving and for which calculation has not yet been completed do not exist, (that is, a calculation set exists which requires data receiving) processing returns to step 310.

At the next step, 328, calculation of a calculation set is executed to fill control table of calculation sets with marks to indicate the completion of calculation. That is, actual calculation using arrays is executed by employing that calculation set to fill the control table of calculation sets with marks to indicate the completion of calculation.

As mentioned before, according to the distributed processing system of the present embodiment, even if the amount of data communication varies for each processor, or the time of data communication varies due to a time lag between processors, when distributed parallel processing of an application program is effected on the distributed processing system, data communication overhead can be reduced and the program can be executed efficiently. Specifically, the effects below can be realized.

Since data receiving and sending between processors is sequentially effected from the processor able to receive or send data to other processors dynamically, data communication can be achieved with high efficiency.

During a wait for data, calculation of a part requiring no data communication can be executed. Thus, the execution of calculation can be doubled in idle time because of the data wait state.

Figure 9A:
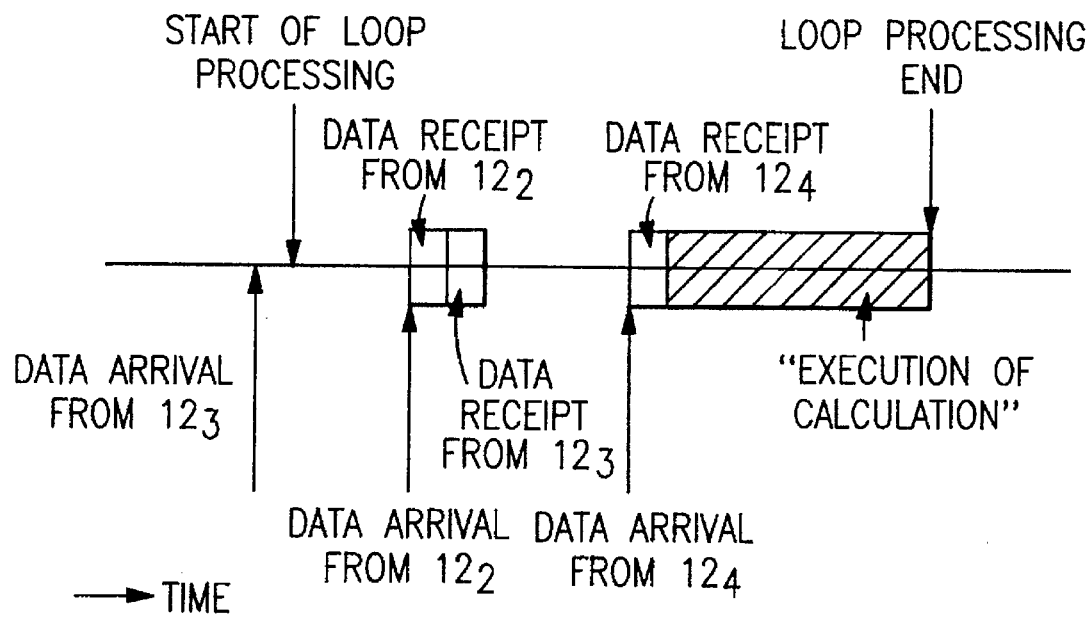
FIG. 9a is a timing chart showing a conventional distributed processing system.
Figure 9B:
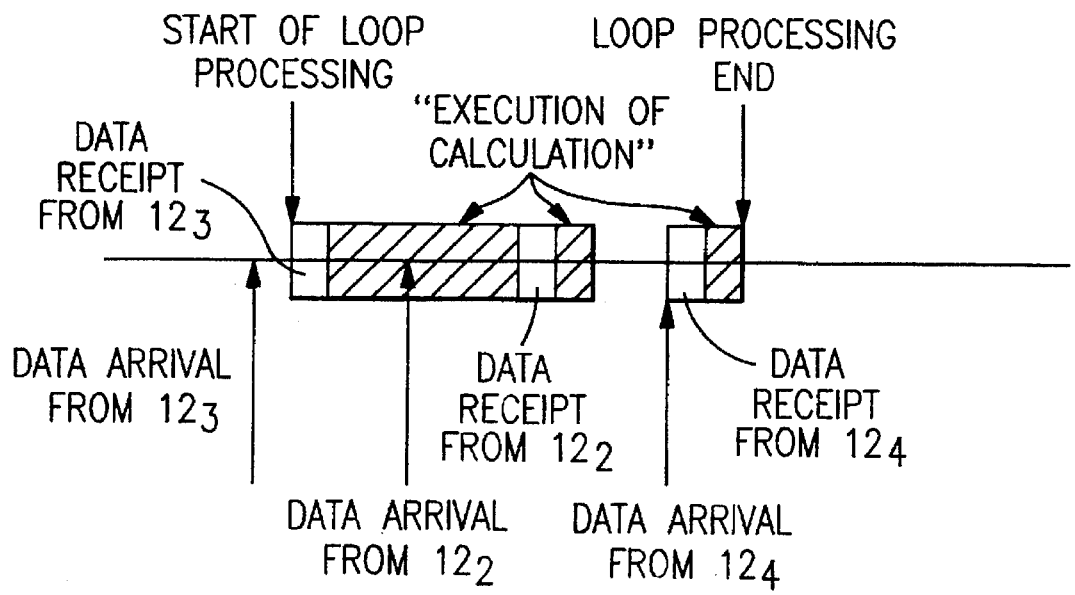
FIG. 9b is a timing chart showing the distributed processing system of the present invention.

In FIGS. 9a and 9b, the processing flow in Program example 1 is shown in timing charts for conventional and distributed processing systems of the present invention. FIG. 9a shows an example of scheduling data sending and receiving statically and data receiving is sequentially executed from the second processor 12$_2$. Then, after all data receiving is completed, calculation is started. FIG. 9b shows the processing flow to which the present invention is applied. After the data is received from the third processor 12$_3$, data from other processors does not arrive and, therefore, part of calculation is started using data wait time. Thus, time required for completing the do loop (loop processing) is reduced compared to when the present invention is not applied.

Where dispersion parallel processing for executing the application program of a technological calculation or the like requiring an enormous amount of calculation is effected on a distributed processing system having a plurality of processors, a system provided with a language processing system or an automatic parallel conversion program to which the method of the invention is applied, the execution-time library or the like is assumed to be particularly effectively employed.

In the above described embodiment, the processing of instructions data_send_receive, get_iteration_set of the generated executable module are executed to communicate required data prior to execution of calculation, making it is essential to first execute the execution-time library data_send_receive. In this case, even when the execution-time library is called, data required for communication is not present, so communication may not be executed.

Although, in the above embodiment, an example in which the present invention is applied to loop processing of arrays was described, it should be understood that the present invention is not limited thereto. For example, there is no processing other than the loop processing of arrays, however, in expressions as the source code, processing of an array assignment statement in array description language such as APL (A Program Language) or FORTRAN (for example, FORTRAN 90) also falls under the category of the present invention.

Specifically, in APL, while it is generally necessary to execute an array operation using a built-in function, a similar operation can be effected to combine the array description language also in FORTRAN. An explanation of this operation will be provided below. FORTRAN 90 is used. For the array description language to be defined, a program shown in (Program example 4) is equivalent to the program shown in (Program example 5).

```
(Program example 4)
A(10:90) = B(11:91)
```

```
(Program example 5)
DO i = 10,90
    A(i) = B(i+1)
END DO
```

According to FORTRAN 90, a statement to which arrays are directly assigned in this way is allowed. Therefore, table preparation of the present invention can be applied to such a statement. Other array operation functions (Transformational Intrinsic Function: TIF) such as SUM, SPREAD, and the like are included in FORTRAN 90.

For example, a statement shown in (Statement example 1) is equivalent to the program shown in (Program example 6) described below.

```
(Statement example 1)
A(1:100, 1:200) = SUM (SPREAD(B(1:10, 1:100), 3,200)
    + (SPREAD(C(1:10, 1:100), 2,100), 1)
```

```
(Program example 6)
DO i = 1,200
    DO j = 1,200
        S = 0
        DO k = 1,10
            S = S + B(k, 1) + C(k, j)
        END DO
        A(i, j) = S
    END DO
END DO
```

It should be noted that the present invention is not limited to APL or FORTRAN 90, and the invention aims at data communication between processors and the efficient execution of calculation and is applicable to any programming language which is executable in a distributed processing environment such as C, C++, PASCAL, ADA (trademark, US Department of Defense). For example, if Program example 3, above, written in FORTRAN, is rewritten in C, the result below is obtained (in C++, a similar result is obtained).

```
(Program example in C)
......
While (having the calculation sets of arrays) {
    data_send_receive;
    get_iteration_set(i_start, i_end, j_start, j_end);
    for (i = i_start; i <= i_end; i++)
        for (j = j_start; j <= j_end; j++)
            a(i)(j) = b(i+1)(J+1) - c(i-1)(j+1);
}
......
```

For PASCAL or ADA, the Program example rewritten thereby will be omitted because the result is substantially the same as above.

According to the present invention, when calculation using arrays in the program is executed, the communication of required data between processors can be controlled dynamically and data communication overhead decreased. Further, the execution of calculation can be effected sequentially from a processor which receives all required data. Furthermore, since information concerning data communication and the like can be controlled in a dynamic manner upon the execution of calculation, a case in which information is determined only upon the execution of calculation can be effectively processed.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A distributed processing control method in a distributed processing system equipped with a plurality of processors, said method comprising the following steps:

(a) designating a group of processors to which a program for effecting distributed parallel processing of calculation is to be loaded, among said plurality of processors, each of which has an ID for identification and in a predetermined number of processors to which array data is distributed and held, said array data belonging to one or a plurality of arrays distributed and held in said predetermined number of processors included in said plurality of processors;

(b) for arrays which are defined or declared in said program, allocating partial arrays, which are to be managed, to each of said processors included in said group;

(c) for calculation using said arrays in said program, preparing a table in each of said processors included in said group, based on said partial arrays managed by each of said processors, said table including a column for listing said IDs of said processors to which information including said array data should be sent from each of said processors included in said group, and for listing said IDs of said processors from which each of said processors included in said group should receive information including said array data, in order to effect calculation; and (d) executing, in each of said processors included in said group, calculation using said arrays by effecting sending and receiving of said information between respective processors included in said group, with reference to said prepared table.

2. A distributed processing control method according to claim 1, wherein, in said table, is prepared a column provided with marks to indicate the completion of sending and receiving and said method further comprises the following steps of assigning said marks to a corresponding column in said table in each of said processors included in said group in response to receiving from other processors or sending to other processors; and effecting sending and receiving until said table is filled with said marks corresponding to all responses.

3. A distributed processing control method according to claim 1, wherein said step (c) further includes the steps of:
for calculation using said arrays, sorting array elements held by each of said processors included in said group from array elements held by other processors;
sorting array elements requiring receiving of array data from array elements requiring no receiving of array data upon calculation in each of said processors included in said group by using said sorting, and
calculating a calculation set in which a group of elements of sorted array elements is expressed by an index expression of array elements.

4. A distributed processing control method according to claim 1, wherein said step (c) further includes the steps of:
for calculation using said arrays, sorting array elements held by each of said processors included in said group from array elements held by other processors,
sorting array elements requiring receiving of array data from array elements requiring no receiving of array data upon calculation in each of said processors included in said group by using said sorting;
further effecting sorting for each of said processors corresponding to one or a plurality of array elements requiring receiving of array data upon said calculation; and
calculating a calculation set in which a group of elements of sorted array elements is expressed by an index expression of the array element.

5. A distributed processing control according to claim 1, wherein said table comprises a control table of sending and receiving data indicating the correspondence of said IDs of other processors to the presence and absence of elements for sending and receiving and control table of the calculation set indicating the correspondence of said IDs of other processors requiring receiving of data upon said calculation and array elements upon said calculation.

6. A distributed processing control method according to claim 1, wherein in said step (a), predetermined and specified processors are designated as a group of processors to which a program is to be loaded.

7. A distributed processing control method according to claim 1, wherein in said step (a), predetermined and specified processors designated at the start of execution of said program are to be designated as a group of processors to which said program is to be loaded.

8. A distributed processing control method according to claim 1, wherein said table is formed in a module capable of executing said program in each of said processors included in said group.

9. A distributed processing system equipped with a plurality of processors, said system comprising:

a designation means for designating a group of processors at which a program for effecting distributed parallel processing of calculation is to be loaded, among said plurality of processors which each have an ID for identification and in a predetermined number of processors of which array data is distributed and held, said array data belonging to one or a plurality of arrays distributed and held in said predetermined number of processors included in said plurality of processors;

an allocation means for allocating partial arrays, which are to be managed, to each of said processors included in said group, for arrays which are defined or declared in said program;

an instruction means for instructing the preparation of a table in each of said processors included in said group, for calculation using said arrays in said program, based on said partial arrays managed by each of said processors included in said group, said table including a column for listing said IDs of said processors to which information including said array data should be sent from each of said processors included in said group and for listing said IDs of said processors from which each of said processors included in said group should receive information including said array data, in order to effect calculation; and a calculation instruction means for executing, in each of said processors included in said group, calculation using said arrays by effecting sending or receiving processing of said information between respective processors included in said group.

10. A distributed processing system according to claim 9, wherein said table is provided with a column which is to be filled with marks indicating the completion of sending or receiving of information and said system further comprises a mark allocation means for allocating said mark to the corresponding column of said table in each of said processors included in said group, in response to receiving of information from other processors or the sending of information to other processors and a control means for controlling to effect said sending/receiving of said information until said table is filled with said marks in response to all sending or receiving processings of said information.

11. A distributed processing system according to claim 9, wherein said instruction means to prepare a table includes:
a first sorting means for sorting, for calculation using said arrays in said program, array elements held by each of said processors included in said group from array elements held by other processors;
a second sorting means for sorting array elements requiring receiving of array data from array elements requiring no receiving of array data, upon calculation in each of said processors included in said group using said sorting; and
a calculation means for calculating a calculation set in which a group of elements of sorted array elements is expressed by an index expression of array elements.

12. A distributed processing system according to claim 9, wherein said instruction means for instructing preparation of a table includes:
a first sorting means for sorting, for calculation using said arrays, array elements held by each of said processors included in said group from array elements held by other processors;

a second sorting means for sorting array elements requiring receiving of said array data from array elements requiring no receiving of said array data upon calculation in each of said processors included in said group using said sorting;

a third sorting means for effecting sorting for each of processors corresponding to one or a plurality of array elements requiring receiving of said array data upon said calculation; and a calculation means for calculating a calculation set in which a group of elements of sorted array elements is expressed by an index expression of array elements.

13. A distributed processing system according to claim 9, wherein said designation means comprises a reading means for reading a group of predetermined and specified processors which is designated as the group of processors to which said program is to be loaded.

14. A distributed processing system according to claim 9, wherein said designation means comprises a reading means for reading a group of predetermined processors which is designated at the start of execution of said program as the group of processors to which said program is to be loaded.

* * * * *

UNITED STATES PATENT AND TRADEMARK OFFICE
CERTIFICATE OF CORRECTION

PATENT NO. : 5,625,832
DATED : April 29, 1997
INVENTOR(S) : Gyo Ohsawa et al.

It is certified that error appears in the above-identified patent and that said Letters Patent is hereby corrected as shown below:

Column 13, table 1, line 12, should be --3 (3:50, 51:51) No (1:49, 51:51) No 1/0 0--

Signed and Sealed this

First Day of June, 1999

Q. TODD DICKINSON

*Attest:*

*Attesting Officer*     Acting Commissioner of Patents and Trademarks